United States Patent [19]

Tsunoda et al.

[11] Patent Number: 4,938,569
[45] Date of Patent: Jul. 3, 1990

[54] ELECTRODE SUBSTRATE FOR ELECTRO-OPTICAL DEVICE

[75] Inventors: Yukiyoshi Tsunoda; Tohru Sakai, both of Tokyo, Japan

[73] Assignee: Seiko Instruments Inc., Japan

[21] Appl. No.: 109,624

[22] Filed: Oct. 16, 1987

[30] Foreign Application Priority Data

Oct. 22, 1986 [JP] Japan .................. 61-251075

[51] Int. Cl.⁵ .............................. G02F 1/133
[52] U.S. Cl. ........................... 350/336; 350/339 F
[58] Field of Search ................. 350/339 F, 336

[56] References Cited

U.S. PATENT DOCUMENTS

| | | |
|---|---|---|
| 4,516,836 | 5/1985 | Ferrato .................. 350/336 |
| 4,632,514 | 12/1986 | Ogawa et al. ............ 359/339 F |
| 4,639,088 | 1/1987 | Suginoya et al. ........ 350/339 F |
| 4,714,636 | 12/1987 | Yokono et al. .......... 350/339 F |

FOREIGN PATENT DOCUMENTS

| | | |
|---|---|---|
| 0011408 | 5/1980 | European Pat. Off. . |
| 2221892 | 10/1974 | France . |
| 0281219 | 12/1986 | Japan .................. 350/339 F |
| 1416072 | 12/1975 | United Kingdom . |
| 2093442 | 9/1982 | United Kingdom . |
| 2111285 | 6/1983 | United Kingdom . |
| 2155023 | 9/1985 | United Kingdom . |

OTHER PUBLICATIONS

Patent Abstracts of Japan, vol. 9, No. 163 (P-371) [1885], 9th Jul. 1985; & JP-A-60 39 616 (Sharp K.K.) 01-03-1985.
Patent Abstracts of Japan, vol. 10, No. 86 (P-443) [2143], 4th Apr. 1986; & JP-A-60 222 822 (Cannon K.K.) 07-11-1985.
Patent Abstracts of Japan, vol. 10, No. 143 (P-459[2200], 27th May 1986; & JP-A-60 263 123 (Citizen Tokei K.K.) 26-12-1985.

Primary Examiner—Stanley D. Miller
Assistant Examiner—Anita Pellman Gross
Attorney, Agent, or Firm—Bruce L. Adams; Van C. Wilks

[57] ABSTRACT

An electrode substrate for an electro-optical device such as a LC display or the else comprising a substrate, a color filter on the substrate and an electrically conductive coating organic film on the color filter.

21 Claims, 1 Drawing Sheet 4,938,569

ELECTRODE SUBSTRATE FOR ELECTRO-OPTICAL DEVICE

BACKGROUND OF THE INVENTION

The present invention relates to an electrode structure of an electro-optical device such as a liquid crystal display equipped with a color filter, or the like.

Several methods are known to accomplish color liquid crystal displays, color electro-optical devices, and the like. Among them, the most ordinary system is one that forms the color filter on one of the substrates because full color display is easy and television display can be made. A typical structure of a conventional color filter substrate is shown in FIGS. 2 and 3. In the drawings, reference numeral 1 represents a glass substrate, 2 is a color filter, 3 is an ITO film and 4 is a liquid crystal layer. The color filter 2 is formed by dying, electro deposition or printing. The ITO film 3 is formed by sputtering or vacuum deposition and is then patterned into an arbitrary shape.

FIG. 2 shows a structure wherein the ITO film 3 is formed on the color filter 2 and FIG. 3 shows a structure wherein the color filter 2 is formed on ITO 3. These structures have the following problems, respectively. In the structure shown in FIG. 2, inferior conduction is likely to occur at a step cover portion of the ITO film 3 relative to the color filter 2. Whereas the color filter 2 ordinarily consists of organic matter, the ITO film 3 consists of inorganic matter so that stress strain occurs due to thermal impact applied during the fabrication process of a panel and exerts adverse influences on the orientation of liquid crystal 4. This problem can be prevented by applying over-coating to the surface of the color filter 2 and then forming the ITO film 3 on the over-coating but this results in a complicated production process and in the increase of cost of production. On the other hand, the structure shown in FIG. 3 is free from the problem of inferior conduction of ITO but is not devoid of the problem in that a voltage applied practically to the liquid crystal layer 2 drops because the color filter 2 as the insulating material exists between the liquid crystal layer 4 and the ITO film 3 as the electrode for driving the liquid crystal.

To cope with this problem, attempts have been made to increase the dielectric constant of the color filter 2 or to render the color filter 2 itself conductive, but they have not yet been entirely practical.

OBJECT OF THE INVENTION

The present invention is directed to solve these problems and to provide a color electro-optical device which can be produced at a low cost of production but has high reliability.

SUMMARY OF THE INVENTION

The gist of the present invention is that an electrode for driving an electro-optical material on a color filter is formed by an electrically conductive coating film.

An electrically conductive coating film such as a resin dispersing therein electrically conductive fine particles is coated as a driving electrode in place of the conventinal ITO film. This arrangement can prevent not only inferior conduction at a step cover but also the disturbance of orientation of the liquid crystal because both the resin and the color filter are made of organic material and their interface does not get distorted due to stress.

DESCRIPTION OF THE PREFERRED EMBODIMENTS

Hereinafter, the present invention will be described in detail with reference to some embodiments thereof.

Figure 1:
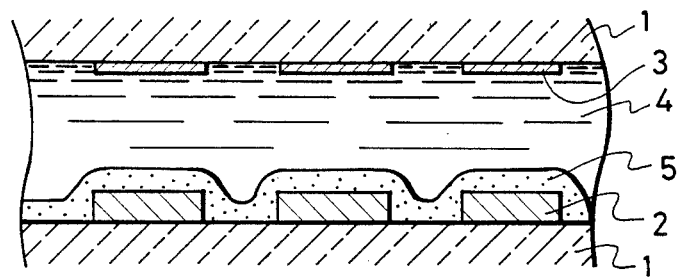
FIG. 1 is a sectional view of an electro-optical device in accordance with one embodiment of the present invention.
Figure 2:
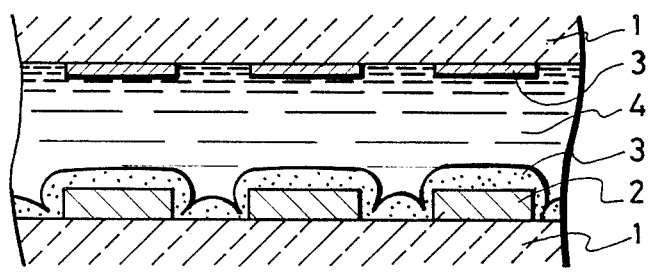
FIGS. 2 and 3 are sectional views of a conventional electro-optical device.
Figure 3:
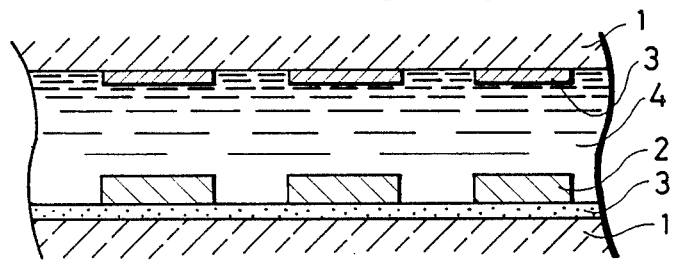

In FIG. 1, reference numeral 1 represents upper and lower substrates made of glass, plastic, ceramics or the like. At least one of the substrates 1 is light transmissive. Numeral 2 is a color filter, 3 is an electro-conductive film preferably made of ITO or of $SnO_2$. Numeral 4 is an electro-optical material layer such as a liquid crystal layer and 5 is an electrically conductive coating film. An orientation film made for example, of polyimide, silane, polyvinyl alcohol, polyamide, polyamide-imide, fluorine-contained polymer, SiO, $SiO_2$, $Al_2O_3$, are $TiO_2$ is formed on the surfaces of the electro-conductive film 3 and the electrically conductive coating film 5 and then subjected to alignment treatment such as rubbing treatment or, oblique vapor deposition as shown in U.S. Pat. No. 3,834,792. The color filter 2 may be formed by the electro-deposition method (as disclosed, for example, in U.S. Pat. No. 4,522,691), a printing method, or a photolithographic method. The device has a dot matrix electrode structure defined by the electro-conductive film 3 and the electrically conductive coating film 5. The dot matrix electrode device may be utilized for a simple matrix electrode device, a 2-terminal device having non-linear-resistive element such as non-stoichiometric compound of silicon oxide, silicon nitride, silicon carbide, germanium oxide, germanium nitride, germanium carbide (as disclosed in U.S. patent application Ser. Nos. 784,239 or 863,199), MIM (as disclosed, for example, U.S. Pat. No. 4,413,883), varistor, or ring diode.

EMBODIMENT 1

For example, a dispersion formed by dispersing fine particles of ITO in an acrylic type resin was printed in a stripe shape by offset printing and then baked on a glass substrate 1 on which color filters 2 as $480 \times 128$ unit pixles were formed. Thus, an electrically conductive application film 5 was formed. This stripe-like electrically conductive application film 5 was inspected by a microscope and subjected to electric measurement, but no inferior conduction was found occurring in all of 480 stripes. An orientation film such as polyimide was formed on the surface of the electrically conductive application film 5 and rubbed, and then the liquid crystal display having the structure shown in FIG. 1 was fabricated. There was thus obtained a good color display device.

It has been a customary practice to form the ITO film as the display electrode by use of a vacuum device such as sputter, but in accordance with the present invention, the electrically conductive resin film 5 as the display electrode can be formed by a printer so that the production process becomes easier and simpler and the cost of production can be reduced drastically.

EMBODIMENT 2

Figure 4:
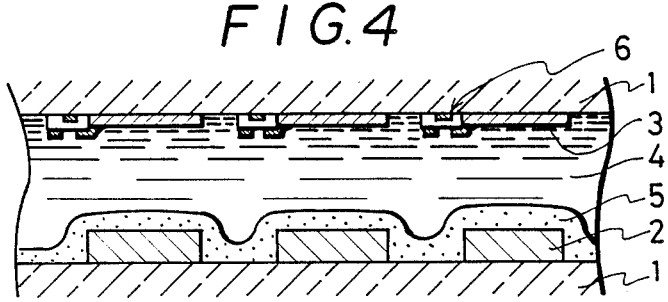
FIG. 4 is a sectional view of an active matrix electro-optical device.

FIG. 4 shows an embodiment of a TFT active matrix LC display device utilizing the invention. In FIG. 4, like reference numerals 1 to 5 corresponding to those of FIG. 1. In case of forming the color filter 2 by the electro-deposition method, a plurality of electrodes are formed on the lower substrate 1 and thereafter the multicolor filter layer 2 is formed on each of the electrodes by electro-deposition. The electrically conductive thereafter coating film 5 is coated on the color filter 2.

In FIG. 4, reference numeral 6 represents a thin film transistor, 3 is an ITO film as a pixel electrode, 2 is a color filter and 5 is an electrically conductive resin film 5 as an opposing electrode. In the active matrix display, the thin film transistor disposed for each pixel is turned ON and OFF to drive the liquid crystal. Therefore, the electrically conductive resin film and the opposing electrodes need be kept at a common potential. In other words, the electrically conductive resin film 5 need not have a stripe but may be formed substantially uniformly on the surface coming into contact with the liquid crystal layer (so-called "whole surface contact electrode"). If the electrically conductive coating film is formed in the stripe shape as in Embodiment 1, the resistance value of the driving electrode becomes somewhat higher than the conventional ITO film and the voltage applied to the electro-optical material layer such as the liquid crystal will drop. However, if the conductive film is used in the form of the "whole surface contact electrode", this problem does not occur and the device of the invention can be employed sufficiently even for a large scale panel.

Therefore, the present invention is extremely effective for a large scale, high precision active matrix liquid crystal display having an extremely small pixel pitch irrespective of printing accuracy.

EMBODIMENT 3

In the liquid crystal devices shown in FIGS. 1 and 4, after the orientation film was formed on the electrically conductive resin film 5, orientation treatment such as rubbing was conducted, but the electrically conductive resin film 5 itself can be used as the orientation film. Namely, fine ITO particles were dispersed in the polyimide resin used as the orientation film of the liquid crystal and coated on the color filter in the same way as in Embodiment 1 to form the electrically conductive resin film. Furthermore, rubbing was made to this electrically conductive resin film to fabricate the liquid crystal display having the same structure as one shown in FIG. 1. It was confirmed that good color display could be made in this manner. This method could form both the conductive film and the orientation film by a single process and could further reduce the cost of production.

The resin of the electrically conductive coating organic film may be, for example, acrylic resin, epoxy resin, vinyl chloride resin, polyimide, polyamide, polyester, polycarbonate, polyethylene, polyurethane, polysulfone or polypropylene.

The conductive fine particles dispersed in the resin may be, for example, ITO (Indium-Tin Oxide), $In_2O_3$, $SnO_2$, $ZnO$, $Sb_2O_5$, Au, Ag, Pt, Cu, Ni or Cr.

Besides the resin dispersing therein the electrically conductive fine particles, it is also possible to use, as the electrically conductive coating film, organic metallic compounds such as alkoxides of In and Sn, metallic compounds of chlorides of In and Sn, and the like, by coating the compound and reacting it by heat-treatment, or hydrolysis so as to impart electric conductivity. Various coating methods can be employed such as printing, spin coating, spraying, or dipping.

A highly reliable color electro-optical device can be obtained at a reduced cost of production by use of an electrically conductive coating film as the electrode of the electro-optical device, as described above.

What is claimed is:

1. An electro-optical device comprising: a pair of spaced-apart substrates sandwiching therebetween an electro-optical material; a conductive layer having a predetermined pattern disposed on the inner surface of one of the substrates; a plurality of color filters disposed on the inner surface of the other of the substrates; and a coated conductive layer of organic material coated on the plurality of color filters.

2. An electro-optical device according to claim 1 wherein the coated conductive layer covers the whole surface of the plurality of color filters.

3. An electrode structure for an electro-optical device comprising: a non-conductive substrate; a plurality of color filters affixed to the substrate; and a coated conductive layer of organic material coated on the plurality of color filters.

4. An electrode structure according to claim 3 wherein the coated conductive layer covers the whole surface of the plurality of color filters.

5. An electrode structure according to claim 3 wherein the color filters comprise electro-deposited color filters formed by electro-deposition on the substrate.

6. An electrode structure according to claim 3 wherein the color filters comprise printed color filters formed by printing on the substrate.

7. An electrode structure according to claim 3 wherein the color filters comprise photolithographed color filters formed by photolithography on the substrate.

8. An electrode structure according to claim 3 wherein the coated conductive layer has an orientation film thereon.

9. An electrode structure according to claim 8 wherein the orientation film comprises a composition selected from the group consisting of polyimide, silane, polyvinyl alcohol, polyamide, polyamide-imide, fluorine-containing polymer, SiO, $SiO_2$, $Al_2O_3$ and $TiO_2$.

10. An electrode substrate according to claim 3 wherein the coated conductive layer comprises a printed layer of organic material.

11. An electrode substrate according to claim 3 wherein the coated conductive layer comprises a spin-coated layer of organic material.

12. An electrode substrate according to claim 3 wherein the coated conductive layer comprises a sprayed layer of organic material.

13. An electrode substrate according to claim 3 wherein the coated conductive layer comprises a dipped layer of organic material.

14. An electrode substrate according to claim 3 wherein the coated conductive layer is comprised of a resin having electrically conductive particles dispersed therein.

15. An electrode substrate according to claim 14 wherein the resin comprises a composition selected from the group consisting of acrylic resin, epoxy resin, vinyl chloride resin, polyimide, polyamide, polyester, polycarbonate, polyethylene, polyurethane, polysulfone or polypropylene.

16. An electrode substrate according to claim 14 wherein the conductive particles comprise a member selected from the group consisting of ITO, $IN_2O_3$, SnO, ZnO, $Sb_2O_5$, Au, Ag, Pt, Cu, Ni and Cr.

17. A method of manufacturing an electrode for an electro-optical device, comprising the steps of:

forming a plurality of color filters in a predetermined pattern on a substrate;

coating said color filters with a layer of electrically conductive organic material;

baking said coating; and forming an orientation layer on said layer of organic material.

18. The method of claim 17 in which said step of coating the color filters comprises the step of printing said electrically conductive organic material layer on said color filters.

19. The method of claim 17 in which said step of coating the color filters comprises the step of spin coating said electrically conductive organic material layer on said color filters.

20. The method of claim 17 in which said step of coating the color filters comprises the step of spraying said electrically conductive organic material layer on said color filters.

21. The method of claim 17 in which said step of coating the color filters comprises the step of dipping the substrate in a solution from which said electrically conductive organic material layer is formed.

* * * * *